May 10, 1927.
C. H. LAND
1,627,910
TRACTOR TRAILER
Filed Sept. 10, 1925
4 Sheets-Sheet 1
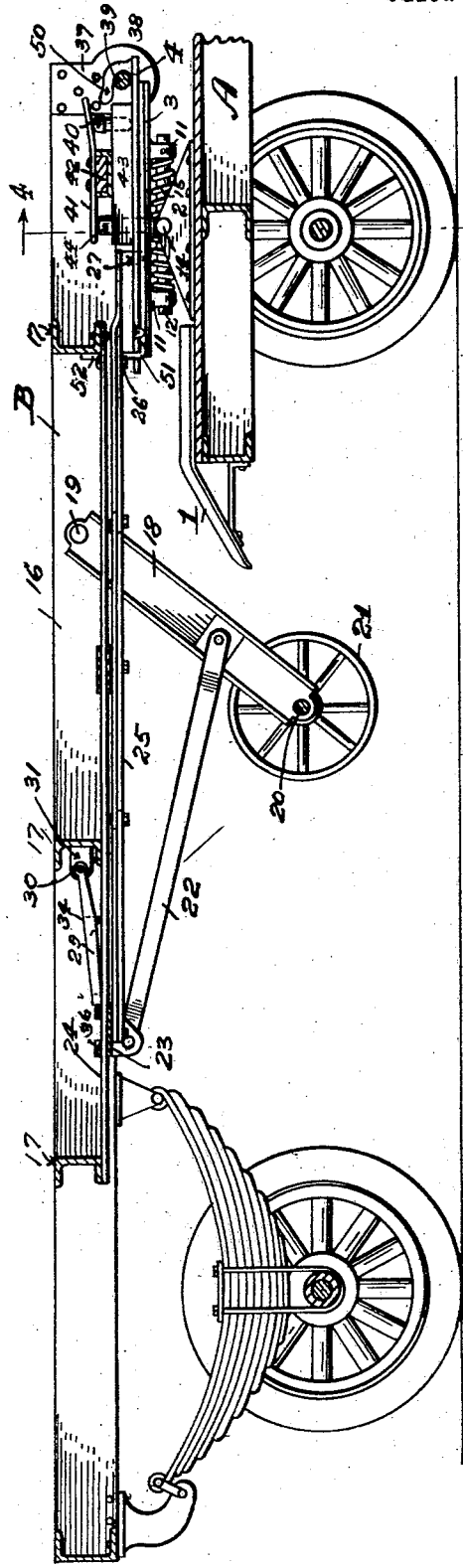
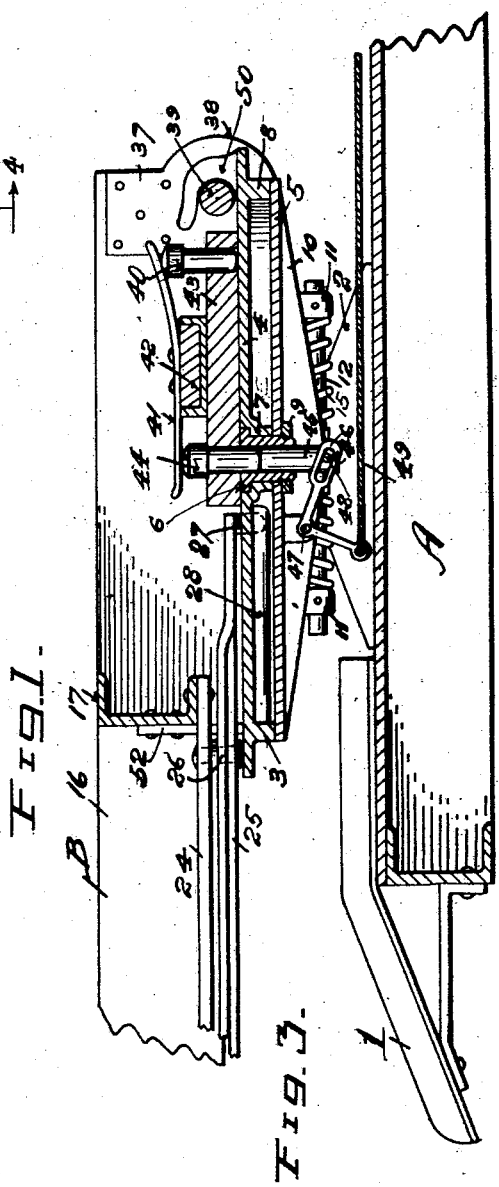
INVENTOR
Charles H. Land
BY
S. C. Thomas
ATTORNEY May 10, 1927.
C. H. LAND
1,627,910
TRACTOR TRAILER
Filed Sept. 10, 1925
4 Sheets-Sheet 2
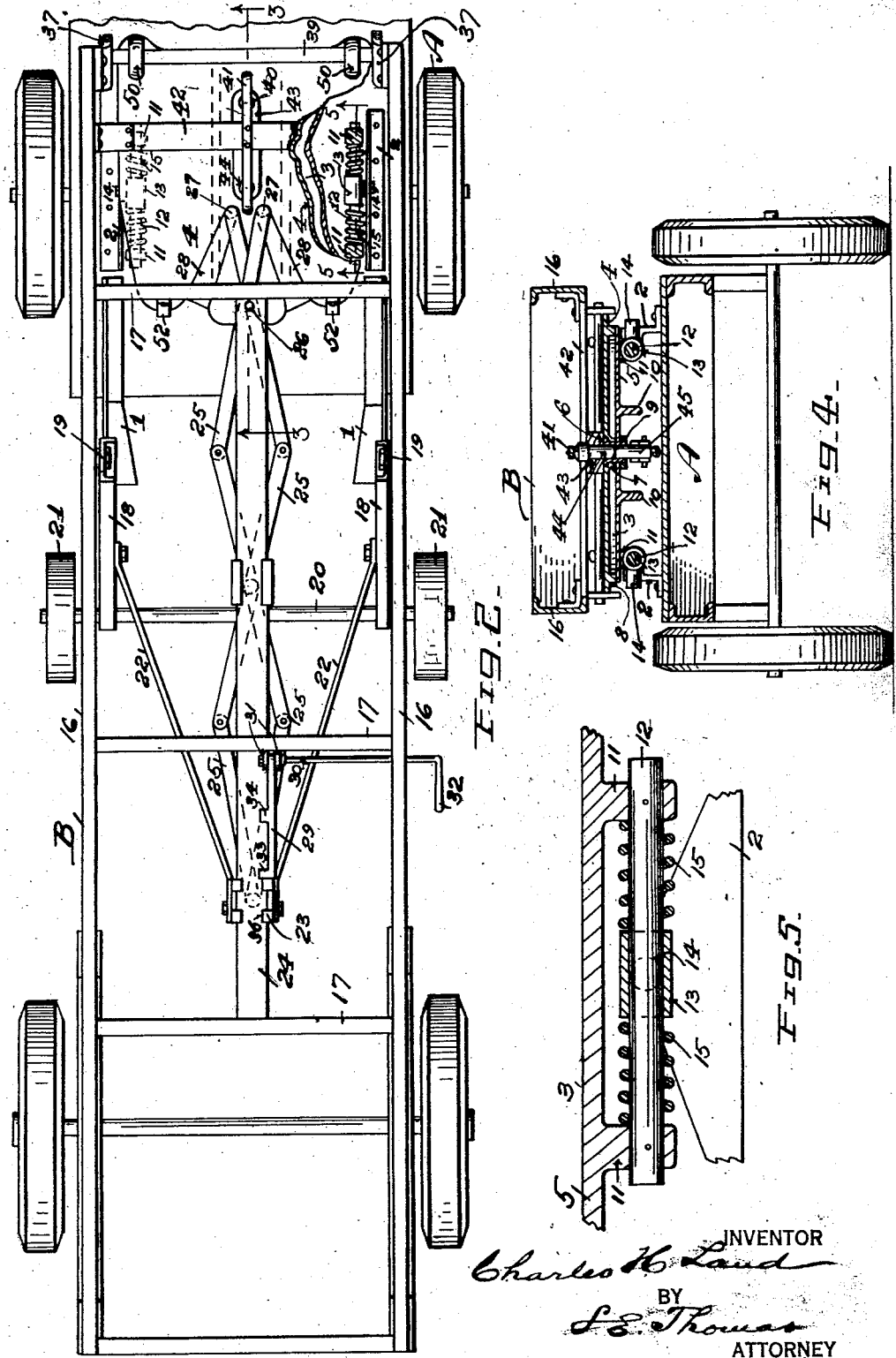
INVENTOR
Charles H. Land
BY
S.E. Thomas
ATTORNEY May 10, 1927.

C. H. LAND 1,627,910

TRACTOR TRAILER

Filed Sept. 10, 1925

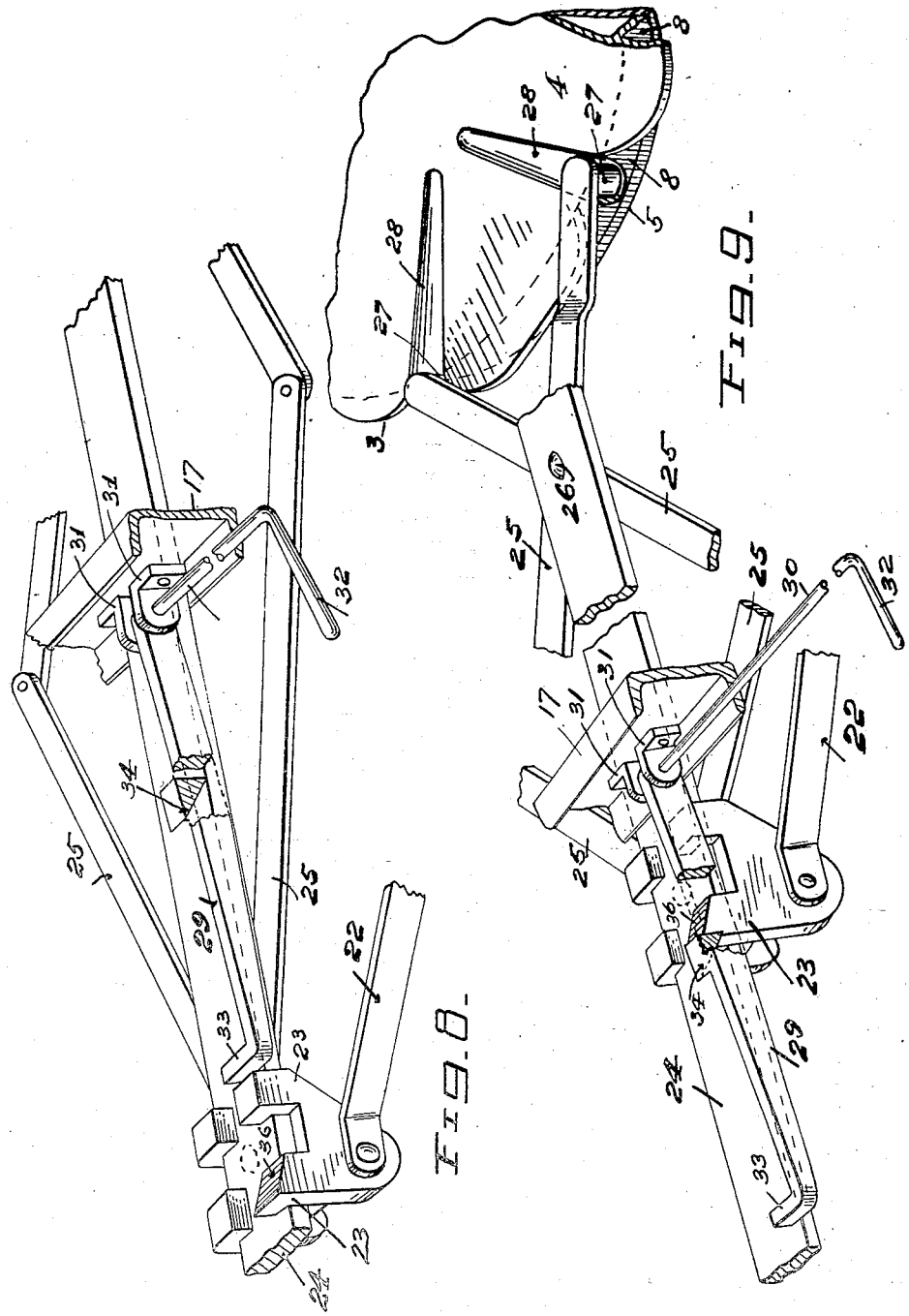

Patented May 10, 1927.

1,627,910

UNITED STATES PATENT OFFICE.

CHARLES H. LAND, OF DETROIT, MICHIGAN.

TRACTOR-TRAILER.

Application filed September 10, 1925. Serial No. 55,465.

This invention relates to tractor-trailers and more particularly the mechanism carried by the tractor and trailer for raising a leg hinged to the trailer to support its forward end upon coupling the trailer and tractor together—the forward end of the trailer being then supported upon the rear end of the tractor for transit therewith; said mechanism also serving upon reversing the direction of the tractor to lower the leg of the trailer that it may again support the trailer when it is desired to uncouple the tractor from the trailer.

Another feature of the present invention includes a tilting fifth wheel carried by the tractor, comprising an upper plate adapted to turn upon a lower plate—the upper plate being formed with converging guide channels to receive a pair of depending stub shafts or rollers carried by the forward end of a toggle lever, adapted to actuate the swinging supporting leg carried by the trailer from a lowered to a raised position or back to its former position that the leg may be raised when the trailer is coupled to the tractor or lowered upon uncoupling the tractor from the trailer.

A further feature of the invention consists in providing the projecting edge of the upper plate overlapping the lower plate of the fifth wheel with engaging lugs, and an annular king-bolt adapted to co-ordinate with means carried by the trailer frame whereby the vehicles may be coupled together and locked in coupled relation.

A further object of the invention is to provide a double locking means between the tractor and trailer, whereby the driver upon backing the tractor toward the trailer to secure a coupling relation will first effect a preliminary coupling of the tractor and trailer—this acting as a reminder to the driver to leave the cab of the tractor that he may manually release a locking mechanism carried by the trailer for securing the supporting leg when lowered, prior to effecting a completed coupling relation between the tractor and trailer—the purpose being to insure against wrecking or otherwise damaging the supporting leg and the mechanism controlling the raising and lowering of same should the driver attempt to back the tractor into the trailer with the view of raising the supporting leg of the trailer by one operation, without first releasing the manually operated locking mechanism for securing the supporting leg when either in its lowered or raised positions.

Upon manually releasing the locking mechanism carried by the trailer for maintaining the leg in supporting position the driver may back the tractor into complete coupling relation with the trailer. In order however to effect a coupling relation it must be understood that a suitable brake mechanism is employed by the trailer to secure the trailer against backing with the tractor when attempting to couple the vehicles together. No brake mechanism however is shown in the drawings as the same forms no part of the present invention.

Another feature of the invention consists in providing a roller bar carried by the trailer adapted to co-operate with the tilting fifth wheel that the latter may be forced into a horizontal position to complete a coupling relation between the vehicles.

Another feature of the invention consists in the L-shaped members carried by the trailer engaging the projecting edge of the upper member of the fifth wheel to secure the latter against tilting with respect to the trailer chassis when the vehicles are in coupled relation.

Another feature of the invention consists in the means for manually releasing the supporting leg when in raised or lowered position and for maintaining it in said respective positions as required.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a longitudinal vertical sectional view through the trailer and the rear end of the tractor in coupled relation.

Figure 2 is a plan view of the trailer and the rear end of the tractor, showing a portion of the fifth wheel carried by the tractor broken away to disclose the shock absorbing mechanisms forming part of the fifth wheel structure.

Figure 3 is a fragmentary longitudinal sectional view on a relatively larger scale, taken on or about line 3—3 of Figure 2.

Figure 4 is a vertical cross-sectional view taken on or about line 4—4 of Figure 1.

Figure 5 is a longitudinal sectional view of a detail taken on or about line 5—5 of Figure 2, showing on an enlarged scale the shock absorbing device carried by the fifth wheel.

Figure 6 is a longitudinal vertical sectional view through the forward end of the trailer and rear end of the tractor, showing the fifth wheel as normally tilted before a coupling relation is effected between the tractor and trailer—the view also shows the roller bar as when ascending the upper member of the inclined fifth wheel before passing the tilting axis of the fifth wheel, journaled in supporting brackets carried by the tractor frame.

Figure 7:
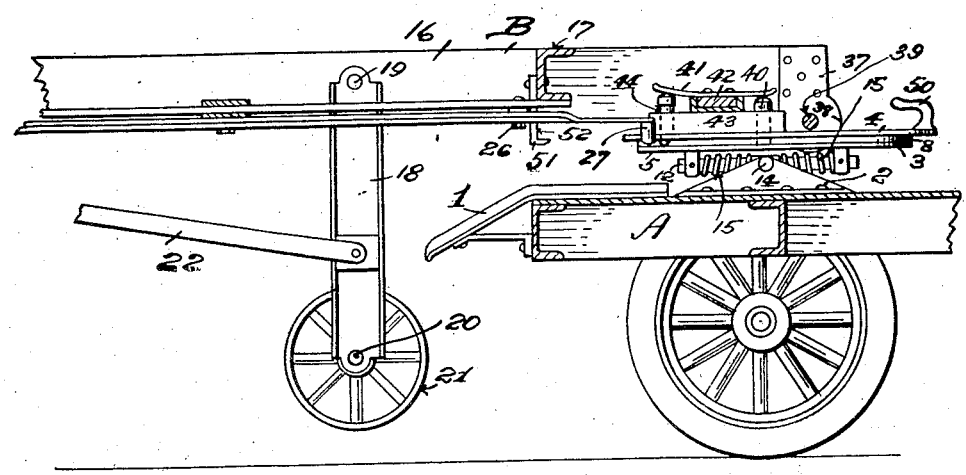

Figure 7 is a similar view showing the fifth wheel forced to a horizontal plane and also the preliminary locking effected between the tractor and trailer—which precedes the raising of the supporting leg.

Figure 8:
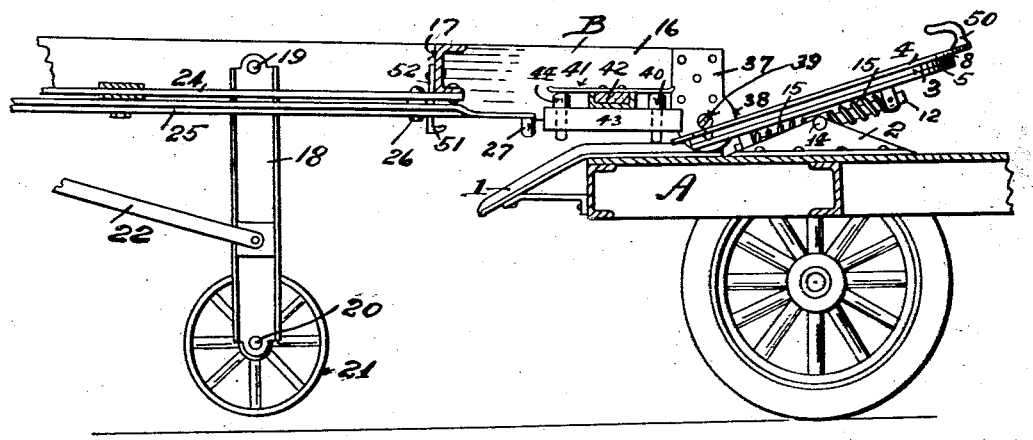

Figure 8 is a fragmentary perspective view showing the locking mechanism for the supporting leg as it would appear after the leg is raised following the initial coupling between the trailer and tractor—also a fragment of the toggle lever or lazy-tong mechanism for raising the leg.

Figure 9 is a similar perspective view showing the manually operated locking mechanism engaging the slidable block connected with the swinging leg to maintain the latter in its lowered position for supporting the forward end of the trailer, the view also shows a fragment of the toggle lever and its depending stub rollers at the forward end of the lever extending into converging grooves formed in the upper member of the fifth wheel, whereby upon driving the tractor the toggle mechanism is actuated to raise or lower the leg by a forward or backward movement of the tractor.

Referring now to the letters of reference placed upon the drawings:

A denotes a tractor provided with a trailer mounting track 1 secured to its end frame. Bolted to the floor of the tractor adjacent to its side sills are pedestals 2, 2, for supporting a tiltable fifth wheel 3, comprising an upper rotatable plate 4, connected to a lower plate 5 by an annular king-bolt 6 extending through a central hub 7 in the upper plate—which with annular flange 8 integral with the upper plate serves to maintain the upper and lower plates of the fifth wheel in spaced relation.

A nut 9 engages the annular king-bolt 6 to secure the upper and lower plates of the fifth wheel together as a unit—the lower plate being stiffened and made rigid by downwardly projecting ribs 10 integral therewith.

Supported in a pair of spaced lugs 11, 11, integral with the lower plate of the fifth wheel and on each side of the latter are shafts 12 on which is respectively mounted a fitting 13 having outwardly projecting trunnions 14, 14, journalled in the respective pedestals 2, 2, secured to the body of the tractor.

Sleeved upon the shafts 12, 12, are springs 15 adapted to bear against the fitting 13 and the lugs 11 to absorb longitudinal shocks received by the fifth wheel.

B denotes a trailer including the usual side sills 16 connected together by a plurality of spaced cross-members 17 bolted to the side sills. A pair of swinging legs 18 are pivoted at 19 to the side sills of the trailer—the lower ends of the legs being connected together by an axle 20, on the outer ends of which are mounted supporting wheels 21, 21.

Respectively pivoted to the swinging legs 18 are lifting bars 22, which at their upper ends are pivoted to a slidable block 23 grooved to receive a longitudinal guide rail or bar 24 bolted to the cross-members 17, connecting the side sills of the trailer frame.

Pivoted to the slidable block 23 is a toggle lever 25, which at its forward end is pivoted at 26 to the guide rail 24.

The projecting forward ends of the toggle lever are respectively fitted with depending rollers 27 adapted to enter a pair of converging grooves 28, 28, formed in the upper plate 4 of the fifth wheel, whereby upon backing the tractor toward the trailer the rollers 27 upon entering the grooves will expand the toggle lever and shift the slidable block 23 connected by the lifting bars 22 with the swinging leg to raise or lower the swinging legs as the tractor may be moved toward or away from the trailer.

To secure the swinging legs when in position to support the forward end of the trailer, or as when raised upon coupling the tractor to the trailer a swinging latch 29 is provided mounted upon a manually operated rock shaft 30 journalled in brackets 31 secured to one of the cross-members 17 of the trailer frame. The rock shaft 30 has a crank arm 32 to facilitate its manual operation.

The forward end of the swinging latch 29 has a right angle bend 33 which is adapted to bear against and intercept the movement of the slidable block 23. As shown in Figure 8 the latch bar is thrown to hold the supporting legs in their raised position as when the trailer is coupled to the tractor.

The swinging latch bar 29 is provided with a wedge-shaped lug 34 integral with the bar, that it may readily ride over the inclined face 36 of the upstanding lug carried by the slidable block 23 and as shown in Figure 9 the lug 34 of the latch bar is engaged with the lug 36 of the slidable block to lock the swinging leg 18 in a vertical position—as when supporting the forward end of the trailer when disconnected from the tractor.

Secured to each of the side sills at the forward end of the trailer frame are plates 37 having an arc-shaped projecting end 38 which when the tractor is backed into the trailer are adapted to slide upwardly on the trailer mounting tracks 1, 1, bolted to the rear end of the tractor frame.

Extending transversely across the forward end of the trailer and supported by the plates 38 is a roller bar 39 which upon coupling the tractor to the trailer rides over the inclined upper plate of the fifth wheel until the tractor has backed sufficiently for the roller bar to pass the pivotal tilting axis of the fifth wheel, whereupon the fifth wheel is caused to swing to a horizontal plane.

The arc-shaped ends of the plates 37 secured to the trailer frame serve to hold the rotatable plate 4 of the fifth wheel carried by the tractor in the requisite position for a locking pin 40, provided with an enlarged head and loosely sleeved in a fitting 43 bolted to a transverse member 42 carried by the trailer, to be forced under the urge of a spring 41, bolted to said transverse member, to enter the central bore of the king bolt 6 of the fifth wheel. A similar locking pin 44 controlled by the spring 41 is also loosely supported in the fitting 43—the purpose of which will be hereafter explained.

Upon the locking pin 40 entering the bore of the annular king bolt the further backing of the tractor is arrested as it then becomes necessary for the driver to leave his cab that he may release the supporting leg of the trailer, by manually tripping the swinging latch 29 that it may release the slidable block 23, connected to the supporting legs of the trailer by the lifting bars 22, whereby the rollers 27 projecting from the ends of the toggle lever into the converging grooves 28 of the fifth wheel may actuate the toggle lever to lift the supporting legs upon a further backing of the tractor toward the trailer.

The locking pin 40 (see Figure 3) is forced out of the socket of the king-bolt 6 by a plunger 45 extending into the lower end of said bolt and actuated by a slotted bell crank lever 46 pivoted at 47 to a lug depending from the lower plate of the fifth wheel.

A pin 48 projects from the plunger 45 into the slot in the arm of the bell crank lever and a cable 49 is connected with the other arm of the bell crank lever leads to the cab of the tractor that the driver may readily release the locking pins 40 and 44 upon pulling the cable to operate the lever.

Upon releasing the locking pin 40 from the socket of the king bolt in the manner indicated the backing of the tractor is continued that the depending rollers 27—carried by the links at the forward end of the toggle lever—entering the converging grooves of the fifth wheel may co-operate to actuate the toggle lever and thereby force the slidable block 36 along the guide rail 24, thus raising the supporting legs 18, connected with the slidable block by the lifting bars 22 into transit position.

The swinging latch bar 29 is then manually actuated to lock the slidable block, whereby the supporting legs are held in their raised position against accidental release.

As the tractor is backed toward the trailer the roller bar 39 carried by the trailer is engaged by a pair of hook-shaped stop lugs 50 integral with the upper plate 4 of the fifth wheel, whereupon the lock pin 44 is forced under the urge of the spring 41 into the socket of the king bolt 6 while the projecting edge of the upper plate 4 is simultaneously engaged by the lips 51 of a pair of spaced angular shaped plates 52 bolted to one of the transverse members 17 of the trailer. The coupling of the tractor and trailer is thus completed—the tilting fifth wheel being held in substantially a horizontal position and is substantially locked to the trailer at three different positions.

When it is desired to disconnect the tractor from the trailer the driver first pulls cable 49 which actuating the bell crank lever 46 forces plunger 45 controlled thereby in an upward direction ejecting the locking pin 44 from the socket of the king bolt and the manual latch is operated to release the sliding block 23. The tractor is then driven forward until the locking pin 40 enters the socket of the king bolt, whereupon the driver leaves his cab and manually actuates the swinging latch 29 to release the slidable block 23 from the end 33 of the latch that the swinging legs may assume a vertical position to support the forward end of the trailer upon the toggle lever mechanism being actuated by a further forward movement of the tractor.

When the legs are in a vertical or supporting position the swinging latch bar is actuated to secure the slidable block that the swinging legs may not collapse under the load of the trailer.

Having thus described my invention what I claim is:

1. In a device of the character described, the combination with a tractor and trailer of a fifth wheel secured to the tractor including a turnable member having converging guide channels adapted to actuate means for operating a supporting leg carried by the trailer; a leg carried by the trailer adapted to support the forward end of the trailer when the latter is disconnected from the tractor and to be released from supporting relation upon coupling the trailer to the tractor, and means co-ordinating with the converging guide channels of the turnable member of the fifth wheel and connected with said supporting leg, whereby upon a forward or backward movement of the tractor the leg may be shifted from a position adapted to support the trailer to a transit position, or vice-versa.

2. In a device of the character described, the combination with a tractor and trailer of a fifth wheel secured to the tractor including a turnable member having converging guide channels adapted to actuate means for operating a supporting leg carried by the trailer; a leg carried by the trailer adapted to support the forward end of the latter when disconnected from the tractor, the same to be released from supporting relation upon coupling the trailer to the tractor for transit therewith; means co-ordinating with said converging guide channels and connected with said supporting leg, whereby upon a forward or backward movement of the tractor the leg may be shifted from its supporting position to its transit position, or vice-versa; manually operated means for locking and releasing the supporting leg in either its transit or trailer supporting positions; means for effecting a preliminary coupling of the tractor to the trailer prior to the manual operation of said leg releasing means, and means for effecting a final coupling relation between the tractor and trailer following the shifting of the leg from its supporting to its transit position.

3. In a device of the character described, the combination with a tractor and trailer of a tiltable fifth wheel secured to the tractor having a rotatable member provided with converging guide ways to receive the forward end of a toggle lever; a toggle lever pivoted to the frame of the trailer adapted at its forward end to enter the converging guide-ways of the rotatable member of the fifth wheel; a swinging leg pivoted to the frame of the trailer for supporting the forward end of the latter when disconnected from the tractor, and means connecting the swinging leg of the trailer with the toggle lever, whereby the leg may be raised or lowered by a forward or backward movement of the tractor with reference to the trailer.

4. In a device of the character described, the combination with a tractor and a trailer of a fifth wheel member secured to the tractor, including an upper plate rotatable upon a lower tiltable plate suitably journalled upon the tractor frame, said upper rotatable plate provided with converging guide-ways adapted to receive the ends of a toggle lever; a toggle lever mechanism pivoted to the frame of the trailer adapted to co-ordinate at one end with the converging guide-ways of the fifth wheel, a swinging supporting leg pivoted to the frame of the trailer, and means connecting said swinging leg with the other end of the toggle lever, whereby the leg may be raised or lowered through the co-ordination of the forward end of the toggle lever with the converging guide-ways of the fifth wheel, upon a forward or backward movement of the tractor with reference to the trailer.

5. In a device of the character described, the combination with a tractor and trailer of a tiltable fifth wheel secured to the tractor having a rotatable member provided with converging guide ways to receive the forward end of a toggle lever; a toggle lever pivoted to the frame of the trailer adapted at its forward end to enter the converging guide-ways of the rotatable member of the fifth wheel; a swinging leg pivoted to the frame of the trailer for supporting the forward end of the latter when disconnected from the tractor; means connecting the swinging leg of the trailer with the toggle lever, whereby the leg may be raised or lowered by a forward or backward movement of the tractor with reference to the trailer, and manually operated means for locking and releasing said swinging leg when swung into transit or load supporting position.

6. In a device of the character described, the combination with a tractor and trailer of a tiltable fifth wheel secured to the tractor having a rotatable member provided with converging guide ways to receive the forward end of a toggle lever; a toggle lever pivoted to the frame of a trailer adapted at its forward end to enter the converging guide-ways of the rotatable member of the fifth wheel; a swinging leg pivoted to the frame of the trailer for supporting the forward end of the latter when disconnected from the tractor; a longitudinally supported guide rail; a movable block slidably mounted upon the guide rail; lifting bars pivotally connected with the leg and slidable block; a manually actuated swinging latch adapted to engage the slidable block to lock or release the pivoted leg when swung into transit or load supporting position.

7. In a device of the character described; the combination with a tractor and trailer of a tiltable fifth wheel secured to the tractor, including a rotatable member provided with converging guide channels; a trailer mounting track secured to the tractor frame; a swinging leg pivoted to the trailer; means co-ordinating with the converging guide channels of the fifth wheel and connected with the supporting leg, whereby the leg may be raised or lowered upon driving the tractor in a backward or forward direction with reference to the trailer; means secured to the trailer frame adapted to traverse the trailer mounting track to guide the trailer into coupling relation with the tractor; means carried by the trailer adapted to force said tiltable fifth wheel into a substantially horizontal plane upon backing the tractor with respect to the trailer, and means for automatically coupling the tractor and trailer together.

8. In a device of the character described, the combination with a tractor and trailer of a tiltable fifth wheel secured to the tractor, including a rotatable member provided with converging channels; an annular king bolt pivotally connecting the rotatable member with the fifth wheel; a movable supporting leg carried by the trailer; means co-ordinating with the converging ways of the fifth wheel for actuating said movable leg; a pair of longitudinally spaced coupling pins suitably supported by the frame of the trailer adapted to successively enter the socket of the annular king bolt to effect a coupling relation between tractor and trailer; manually operated means for locking and releasing the supporting leg in either its transit or trailer supporting positions, and means whereby said coupling pins may be forced from the annular king bolt following the operation of said manually actuated means for locking said leg in either supporting or transit positions.

9. In a device of the character described, the combination with a tractor and trailer of a fifth wheel secured to the tractor, including a rotatable member; an annular king bolt pivotally connecting the rotatable member with the fifth wheel; a movable supporting leg carried by the trailer; means co-ordinating with means carried by the fifth wheel for actuating said movable leg; a pair of coupling pins longitudinally spaced and suitably supported in the frame of the trailer, adapted to subsequently enter the socket of the annular king bolt to effect a successive coupling relation between the tractor and trailer; manually operated means for locking and releasing the supporting leg in either its transit or trailer supporting positions, and means whereby said coupling pins may be respectively forced from the annular king bolt following the operation of said manually actuated means for locking the leg in either supporting or transit positions.

10. In a device of the character described, the combination with a tractor and trailer of a tiltable fifth wheel secured to the tractor, including a rotatable member pivotally connected therewith by an annular king bolt; a trailer mounting track secured to the tractor frame; a movable supporting leg carried by the trailer; means for actuating said movable leg; means carried by the trailer adapted to traverse the trailer mounting track; means supported by said last named means adapted to force said tiltable fifth wheel to a horizontal plane upon backing the tractor toward the trailer to effect a coupling relation therewith; a pair of coupling pins suitably supported in the frame of the trailer and longitudinally spaced, whereby they may successively enter the socket of the annular king bolt; resilient means adapted to respectively urge said pins into the socket of the king bolt; manually operated means for locking and releasing the supporting leg in either transit or trailer supporting positions, and means whereby said coupling pins may be forced from the annular king bolt following the operation of said manually actuated means for locking the supporting leg in either transit or supporting positions.

11. In a device of the character described, the combination with a tractor and trailer of a tiltable fifth wheel supported on longitudinally movable trunnions journalled on suitable pedestals bolted to the body of the tractor; an upper rotatable plate having converging channels and pivoted to the tilting portion of the fifth wheel by an annular king bolt, resilient shock absorbing means on either side of said trunnions adapted to absorb longitudinal stresses due to coupling the tractor and trailer; an adjustable trailer supporting leg; means controlled by the rotatable plate of the fifth wheel and connected with said leg for automatically shifting the leg from its trailer supporting position to its transit position or vice-versa upon a forward or backward movement of the tractor with reference to the trailer; a pair of longitudinally spaced and medially disposed coupling pins loosely supported in a frame of the trailer, adapted to successively enter the annular king bolt to respectively effect a preliminary and final coupling of the tractor and trailer; means adapted to successively urge said pins into the socket of the king bolt upon a further movement of the tractor with reference to the trailer; means, adapted to be manually actuated from the cab of the tractor, for forcing said locking pins out of the king bolt and manually operated means for locking the supporting leg in its adjusted positions following the preliminary engagement or release of the respective coupling pins.

12. In a device of the character described, the combination of a tractor and a trailer, a leg for supporting the forward end of the trailer when disconnected from the tractor, means for effecting a preliminary coupling between the tractor and trailer, and means for effecting a final coupling therebetween, and a latch for holding the leg in supporting or transit position, the final coupling of the tractor and trailer being permitted upon release of the leg holding latch and the preliminary coupling means.

13. In a device of the character described, the combination of a tractor and a trailer, a supporting leg for the forward end of the trailer when disconnected from the tractor, a fifth wheel on the tractor having means thereon cooperating with means on the trailer for effecting the coupling of the trailer and tractor, toggle levers operable to shift the supporting leg to supporting or transit position by engagement with the fifth wheel during forward or backward movement of the tractor, and means on the trailer for holding the fifth wheel in position so that the coupling action and the operation of the toggle levers can be accomplished.

14. In a device of the character described, the combination of a tractor and a trailer, a supporting leg for the forward end of the trailer when disconnected from the tractor, means for automatically shifting the leg to supporting or transit position upon forward or backward movement of the tractor, a latch for holding the leg in supporting or transit position, means for effecting the coupling of the tractor and trailer and means for arresting the coupling action before the completion and until the leg holding latch is released.

15. In a device of the character described, the combination with a tractor and trailer of a fifth wheel secured to the tractor, including a turnable and tilting member adapted to actuate means for operating a supporting leg carried by the trailer; a leg carried by the trailer for supporting the forward end of the latter when disconnected from the tractor to be released from supporting position upon coupling the trailer to the tractor; and means co-ordinating with the turnable and tilting member of the fifth wheel and connected with the supporting leg, whereby upon a forward movement of the tractor the leg may be shifted from a transit to a supporting position, the tiltable member being thereby disconnected from the trailer.

In testimony whereof, I sign this specification.

CHARLES H. LAND.